United States Patent
Boylan et al.

(10) Patent No.: US 10,968,569 B2
(45) Date of Patent: Apr. 6, 2021

(54) POLYVINYL ALCOHOL STABILIZED ACETATE ETHYLENE COPOLYMER DISPERSIONS AS ADHESIVES FOR CREPED WEBS

(71) Applicants: WACKER CHEMIE AG, Munich (DE); John Richard Boylan, Bethlehem, PA (US); Dennis Sagl, Fogelsville, PA (US)

(72) Inventors: John Richard Boylan, Bethlehem, PA (US); Dennis Sagl, Fogelsville, PA (US)

(73) Assignee: WACKER CHEMIE AG, Munich (DE)

(*) Notice: Subject to any disclaimer, the term of this patent is extended or adjusted under 35 U.S.C. 154(b) by 0 days.

(21) Appl. No.: 16/097,018

(22) PCT Filed: Apr. 21, 2017

(86) PCT No.: PCT/US2017/028791
§ 371 (c)(1),
(2) Date: Oct. 26, 2018

(87) PCT Pub. No.: WO2017/189350
PCT Pub. Date: Nov. 2, 2017

(65) Prior Publication Data
US 2019/0127916 A1    May 2, 2019

Related U.S. Application Data

(60) Provisional application No. 62/328,787, filed on Apr. 28, 2016.

(51) Int. Cl.
| | | |
|---|---|---|
| *D21H 17/36* | (2006.01) |
| *D21H 21/14* | (2006.01) |
| *D21H 19/12* | (2006.01) |
| *D21H 27/02* | (2006.01) |
| *C09J 131/04* | (2006.01) |
| *C08F 218/08* | (2006.01) |
| *B31F 1/12* | (2006.01) |
| *D06C 23/04* | (2006.01) |
| *D04H 1/74* | (2006.01) |
| *D04H 1/587* | (2012.01) |
| *C08L 29/04* | (2006.01) |
| *B31F 1/14* | (2006.01) |

(52) U.S. Cl.
CPC .............. *D21H 17/36* (2013.01); *B31F 1/12* (2013.01); *B31F 1/124* (2013.01); *C08F 218/08* (2013.01); *C08L 29/04* (2013.01); *C09J 131/04* (2013.01); *D04H 1/587* (2013.01); *D04H 1/74* (2013.01); *D06C 23/04* (2013.01); *D21H 19/12* (2013.01); *D21H 21/14* (2013.01); *D21H 21/146* (2013.01); *D21H 27/02* (2013.01); *B31F 1/126* (2013.01); *B31F 1/14* (2013.01); *C08F 2800/20* (2013.01)

(58) Field of Classification Search
None
See application file for complete search history.

(56) References Cited

U.S. PATENT DOCUMENTS

| | | | |
|---|---|---|---|
| 4,304,625 A | 12/1981 | Grube et al. |
| 4,449,978 A | 5/1984 | Iacoviello |
| 4,994,146 A | 2/1991 | Soerens |
| 5,246,544 A | 9/1993 | Hollenberg et al. |
| 5,326,434 A | 7/1994 | Carevic et al. |
| 5,674,590 A | 10/1997 | Anderson et al. |
| 6,129,815 A * | 10/2000 | Larson ............... D21H 27/40 156/183 |
| 6,824,635 B2 | 11/2004 | Goldstein et al. |
| 6,908,524 B2 | 6/2005 | Goldstein et al. |
| 6,918,305 B2 | 7/2005 | Pangrazi et al. |
| 6,974,520 B2 | 12/2005 | Goldstein et al. |
| 8,012,285 B2 | 9/2011 | Goldstein et al. |
| 8,273,414 B2 | 9/2012 | Daniels et al. |
| 2003/0176133 A1 | 9/2003 | Walker et al. |
| 2013/0149929 A1 | 6/2013 | Boylan et al. |

FOREIGN PATENT DOCUMENTS

EP    2138548 A1    12/2009

OTHER PUBLICATIONS

Fox T. G. Bull Am. Physics Soc. 1, 3, p. 123 (1956).
Polymer Handbook 2nd Edition, J. Wiley & Sons, New York (1975).

* cited by examiner

*Primary Examiner* — Dennis R Cordray
(74) *Attorney, Agent, or Firm* — Brooks Kushman P.C.

(57) ABSTRACT

A crepe process includes applying an adhesive composition to a nonwoven web, drying, and creping the nonwoven web on a creping drum. The improvement includes using an adhesive composition that includes an aqueous copolymer dispersion obtained by emulsion polymerization of a monomer mixture including 65 to 94.5% by weight of vinyl acetate, 5 to 30% by weight of ethylene, (meth)acrylamide, and 0.1 to 4% by weight of an N-methylol functional monomer. The N-methylol functional monomer constitutes from 25 to 85% by weight of the combined amounts of acrylamide and N-methylol functional monomer, which combined amounts constitute from 0.5 to 5% by weight of the monomer mixture. The emulsion polymerization is performed in the presence of 1 to 10% by weight of polyvinyl alcohol, based on the total weight of all monomers used for the polymerization. The adhesive composition does not include alkylphenol ethoxylates, phosphate ester surfactants, or sodium laureth sulfate.

3 Claims, No Drawings

POLYVINYL ALCOHOL STABILIZED ACETATE ETHYLENE COPOLYMER DISPERSIONS AS ADHESIVES FOR CREPED WEBS

CROSS REFERENCE TO RELATED APPLICATION

This application is a U.S. National Phase Application of PCT/US2017/028791, filed Apr. 21, 2018, which is related to and Claims the benefit of U.S. Provisional Application No. 62/328,787, entitled POLYVINYL. ALCOHOL STABILIZED VINYL ACETATE ETHYLENE COPOLYMER DISPERSIONS AS ADHESIVES FOR CREPE WEBS filed on Apr. 28, 2016, the contents of which are incorporated herein by reference.

FIELD OF THE INVENTION

The invention relates to a crepe process which comprises applying a polymeric adhesive composition to a nonwoven web, and creping the nonwoven web on a creping drum.

BACKGROUND OF THE INVENTION

Disposable paper products have been used as a substitute for conventional cloth wipers and towels. In order for these paper products to gain consumer acceptance, they must closely simulate cloth in both perception and performance. Softness is highly desirable for any wipers and towels because consumers find soft paper products more pleasant. One of the prior art attempts to increase softness in the paper products without sacrificing strength is creping the paper from a drying surface with a doctor blade. Creping disrupts and breaks the above-discussed interfiber bonds as the paper web is fluffed up. As a result of some broken interfiber bonds, the creped paper web is generally softened.

Crepe processes, especially double recrepe (DRC) processes, involve creping a base sheet or nonwoven web on a drum, printing a polymeric adhesive composition on one side of the sheet, flash drying the adhesive composition, creping the base sheet on a drum again, printing a polymeric adhesive composition on the other side of the base sheet, flash drying the adhesive composition, and then creping the base sheet a third time. The base sheet is printed while traveling through gravure nip rolls. Various crepe processes and binding materials used in the processes are known, for example as disclosed in U.S. Pat. No. 5,674,590.

U.S. Pat. No. 4,304,625 discloses creping adhesive compositions comprising an aqueous vinyl acetate ethylene copolymer dispersion and a water-soluble polyvinyl alcohol.

U.S. Pat. No. 4,994,146 describes the improvement of the adhesion between the tissue sheet and the creping cylinder during creping by applying one adhesive (polyether or polyamide) to the sheet and another adhesive (polyacrylic acid) to the cylinder.

U.S. Pat. No. 5,246,544 discloses crosslinkable creping adhesives composed of non-self-crosslinkable polymers with crosslinkable groups like hydroxyl group and an ionic crosslinking agent like zirconium compounds.

A creping adhesive formulation comprising polyvinyl alcohol and a polyhydric alcohol like pentaerythritol, and optionally a phosphate salt is the subject of U.S. Pat. No. 5,326,434. Emulsifier-stabilized aqueous dispersions of vinyl acetate ethylene N-methylol acrylamide copolymers for the use in creping adhesives are disclosed in U.S. Pat. Nos. 6,824,635 and 8,012,285 and 6,908,524 and 6,974,520 and 8,273,414.

Aqueous dispersions of vinyl acetate ethylene copolymers with comonomer units derived from N-methylol acrylamide and acrylamide, which are stabilized with polyvinyl alcohol, are used only as nonwoven binders (U.S. Pat. No. 4,449,978, US 2013/0149929), but not as adhesives in a crepe process. US 2003/0176133 A1 discloses use of such polymers having high N-methylol acrylamide content as binders for providing wet strength to fibrous substrates and for use in double recreped paper.

SUMMARY OF THE INVENTION

A crepe process includes applying an adhesive composition to a nonwoven web, drying, and creping the nonwoven web on a creping drum. The improvement includes using an adhesive composition that includes an aqueous copolymer dispersion obtained by emulsion polymerization of a monomer mixture including 65 to 94.5% by weight of vinyl acetate, 5 to 30% by weight of ethylene, (meth)acrylamide, and 0.1 to 4% by weight of an N-methylol functional monomer. The N-methylol functional monomer constitutes from 25 to 85% by weight of the combined amounts of acrylamide and N-methylol functional monomer, which combined amounts constitute from 0.5 to 5% by weight of the monomer mixture. The emulsion polymerization is performed in the presence of 1 to 10% by weight of polyvinyl alcohol, based on the total weight of all monomers used for the polymerization. The adhesive composition does not include any of the following types of surfactant: alkylphenol ethoxylates, phosphate esters, or sodium laureth sulfate.

DETAILED DESCRIPTION OF THE INVENTION

The inventors have found that vinyl acetate ethylene copolymer dispersions (VAE dispersions) that are nonionically stabilized provide improved compatibility with ionic additives in the adhesive composition and improvement in the creping adhesive strength, thus insuring good creping off the creping drum, and also provide improved heat age viscosity stability.

VAE Copolymer

Unless specified otherwise, percentages by weight of monomers mentioned herein are based on the total weight of all monomers used for the polymerization to make the VAE copolymer, with the weight percentages of the monomers summing in each case to 100%. Similarly, monomer percentages in a copolymer are reported on a weight basis. VAE copolymers for use in crepe processes according to the invention comprise polymerized units of vinyl acetate, ethylene, an N-methylol-functional monomer, and (meth)acrylamide, i.e., acrylamide and/or methacrylamide. Vinyl acetate is copolymerized in general in an amount of at least 65% by weight, or at least 70%, and at most 94.5% by weight, or at most 85%. Ethylene is copolymerized in general in an amount of at least 5% by weight, or at least 10%, and at most 30% by weight.

The fraction of the N-methylol-functional monomer in the copolymer is typically at least 0.1% by weight, or at least 0.2%, 0.3%, 0.4%, or 0.5% by weight, and is typically at most 4.0% by weight, or at most 3.5%, or 3.0%, or 2.5% by weight, based in each case on the total weight of monomers used for the polymerization.

Suitable amounts of N-methylol-functional monomer, relative to the total of N-methylol-functional monomer plus (meth)acrylamide, are at least 25% by weight, or at least 30%, 35%, 40%, 45%, 50%, or 55% by weight. The amount will be at most 85%, or at most 80%, 75%, 70%, 65%, or 60% by weight.

The total amount of N-methylol-functional monomer plus (meth)acrylamide present in the copolymer is at least 0.2% by weight, or at least 0.3%, 0.4%, 0.5%, 0.6%, 0.7%, 0.8%, 0.9%, or 1.0% by weight, and at most 5.0% by weight, or at most 4.5%, 4.0%, 3.5%, 3.0%, 2.5%, or 2.0% by weight.

Suitable exemplary N-methylol-functional monomers for making the copolymer include N-methylolacrylamide (NMA), N-methylolmethacrylamide, allyl N-methylolcarbamate, and esters of N-methylolacrylamide, N-methylolmethacrylamide, or of allyl N-methylolcarbamate. N-methylolacrylamide and N-methylol-methacrylamide are particularly preferred. The N-methylol-functional monomer is used in combination with acrylamide and/or methacrylamide, preferably in combination with acrylamide. Most preferred are blends of N-methylolacrylamide and acrylamide. Such blends are commercially available, example being a 48% aqueous solution of NMA and acrylamide in a 1:1 molar ratio, available under the tradename CYLINK® NMA-LF MONOMER (Cytec Industries, Woodland Park, N.J.), or an aqueous solution containing 28% b.w. N-methylolacrylamide and 20% b.w. acrylamide, available under the tradename Flocryl® NMA 2820 (SNF Floerger, Andrezieux, France). Alternatively, the NMA and acrylamide may be added separately to the polymerization feed.

In addition to NMA, other N—($C_{1-4}$) alkylol (meth)acrylamides may be included in the VAE copolymer. Olefinically unsaturated monomers containing cellulose-reactive moieties may also be included, for example those containing aldehyde, protected aldehyde, and glycolic acid moieties. Examples include i-butoxymethylacrylamide, acrylamidoglycolic acid, acrylamidobutyraldehyde, and dialkyl acetals of acrylamidobutyraldehyde in which the alkyl groups each individually have 1 to 4 carbon atoms.

Optionally, in some embodiments the range of available properties for the copolymer in the dispersion may be extended by including additional monomers in the VAE copolymer. Typically, suitable comonomers are monomers with a single polymerizable olefinic group. Examples of such comonomers are vinyl esters of carboxylic acids having 3 to 18 C atoms. Preferred vinyl esters are vinyl propionate, vinyl butyrate, vinyl 2-ethyihexanoate, vinyl laurate, 1-methyl vinyl acetate, vinyl pivalate, and vinyl esters of α-branched monocarboxylic acids having 9 to 11 C atoms, examples being VEOVA9™ or to VEOVA10™ esters (available from Momentive Specialty Chemicals, Houston, Tex.). Other suitable comonomers include esters of acrylic acid or methacrylic acid with unbranched or branched alcohols having 1 to 15 C atoms. Exemplary methacrylic esters or acrylic esters include methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate. Other suitable comonomers include vinyl halides such as vinyl chloride, or olefins such as propylene. In general the further comonomers are copolymerized in an amount of 0.5 to 30% by weight, preferably 0.5 to 20% by weight, based on the total weight of monomers used for the polymerization. Optionally, 0.05 to 10% by weight, based on the total weight of monomers used for the polymerization, of other monomers (auxiliary monomers) may additionally be copolymerized in forming the dispersion. Auxiliary monomers include a polymerizable olefinic group and at least one additional functional group. The additional functional groups may include reactive groups such as carboxylic or sulfonic acid groups. Examples of auxiliary monomers are ethylenically unsaturated monocarboxylic and dicarboxylic acids, typically acrylic acid, methacrylic acid, fumaric acid and maleic acid; acrylonitrile; monoesters and diesters of fumaric acid and maleic acid, such as the diethyl and diisopropyl esters, and also maleic anhydride, ethylenically unsaturated sulphonic acids and their salts, typically vinylsulphonic acid, 2-acrylamido-2-methylpropanesulphonic acid. Typically, there is only one polymerizable olefinic group in each monomer used to make the VAE copolymer, although in some cases there may be more.

The choice of monomers or the choice of the proportions by weight of the monomers is preferably made in such a way that, in general, the copolymer has a suitable glass transition temperature (Tg). Typically, the Tg is at least −10° C., or at least −5° C., or at least 0° C., and at most +20° C., or at most +15° C., or at most +10° C. The glass transition temperature Tg of the copolymers can be determined in a known way by means of differential scanning calorimetry (DSC) with a heating rate of 10° K per minute according to ASTM D3418-82 as midpoint temperature. The Tg can also be calculated approximately beforehand by means of the Fox equation. According to Fox T. G., Bull. Am. Physics Soc. 1, 3, page 123 (1956): $1/Tg = x1/Tg1 + x2/Tg2 + \ldots + xn/Tgn$, where xn is the mass fraction (% by weight/100) of the monomer n and Tgn is the glass transition temperature in kelvin of the homopolymer of the monomer n. Tg values for homopolymers are given in the Polymer Handbook 2nd Edition, J. Wiley & Sons, New York (1975).

While some applications may favor the inclusion of monomers other than vinyl acetate, ethylene, an N-methylol monomer and (meth)acrylamide in the VAE, for example the monomers listed above, it may nonetheless in some cases be advantageous to exclude certain monomers in making the VAE copolymer, depending on the specific needs of a given application. In other cases, these monomers may be included up to a limit of 1.0 wt % of the monomers used in the polymerization. The excluded or limited monomers may include any one or more of the following: i-butoxy methylacrylamide; acrylamidoglycolic acid; acrylamidobutyraldehyde; dialkyl acetals of acrylamidobutyraldehyde; glycidyl-containing compounds (e.g., glycidyl (meth)acrylate, triglycidyl isocyanurate, etc.); ethylenically unsaturated phosphates, phosphonates or sulfates; ethylenically unsaturated silicon compounds; (meth)acrylic esters; vinyl ethers; acrylonitrile; butadiene; styrene; vinyltoluene; divinyl benzene and/or other olefinically unsaturated hydrocarbons other than ethylene; halogenated monomers (e.g., vinyl chloride); fluorinated monomers, and esters of allyl alcohol.

Polyvinyl Alcohol (PVOH)

Polyvinyl alcohol (PVOH) is used as protective colloids to stabilize the VAE dispersions during and after the polymerization reaction. Suitable PVOH's include partially hydrolyzed polyvinyl alcohols having a degree of hydrolysis of 80 to 99 mol %, preferably 85 to 95 mol %, and a viscosity, in 4% strength aqueous solution, of 1 to 30 mPas (Hoeppler viscosity, determined at 20° C. in accordance with DIN 53015). Most preferred are polyvinyl alcohols having a degree of hydrolysis of 86 to 89 mol % and a 4% strength aqueous solution viscosity in a range from 3 to 6 mPas. Such PVOH's are commercially available or obtainable by processes known to the skilled person. A single PVOH having the recited degree of hydrolysis may be used, or a combination of two or more PVOH's having different degrees of hydrolysis that in combination have the recited degree of hydrolysis.

The polyvinyl alcohol or combination of polyvinyl alcohols serving as the dispersion stabilizer will typically be present at a level of at least 1% by weight, or at least 1.5%, 2%, 2.5%, or 3%. Typically, the level will be at most 10%, or at most 9%, 8%, 7%, 6%, 5%, or 4%. These percentages indicate the amount of polyvinyl alcohol(s) relative to the total weight of all monomers used for the polymerization.

Emulsion Polymerization Procedure

The VAE dispersions stabilized with polyvinyl alcohol may be prepared by emulsion polymerization, typically at a temperature in a range from 40° C. to 100° C., more typically 50° C. to 90° C. and most typically 60° C. to 80° C. The polymerization pressure is generally between 40 and 100 bar, more typically between 45 and 90 bar, and may vary particularly between 45 and 85 bar, depending on the ethylene feed.

Polymerization may be initiated using a redox initiator combination such as is to customary for emulsion polymerization. Redox initiator systems may be used to prepare VAE dispersions suitable for use according to the invention. The initiators may be formaldehyde-generating redox initiation systems such as sodium formaldehyde sulfoxylate. In some embodiments, however, it is desirable to minimize the formaldehyde level in the dispersion. In such cases, it is desirable to use a non-formaldehyde generating redox initiation system. In general, suitable non-formaldehyde generating reducing agents for redox pairs include, as non-limiting examples, those based on ascorbic, bisulfite, erythorbate or tartaric chemistries as known in the art, and a commercial reducing agent known as BRUGGOLITE® FF6M manufactured by Bruggeman Chemical of Heilbronn, Germany. Non-redox Initiators may also be used, such as persulfates, peroxides and azo-type initiators, all of which are well known in the art.

During polymerization the dispersion is stabilized with one or more polyvinyl alcohols. It is preferable not to add emulsifiers in the polymerization for making the dispersion. All of the monomers may form an initial charge, or all of the monomers may form a feed, or portions of the monomers may form an initial charge and the remainder may form a feed after the polymerization has been initiated. The feeds may be separate (spatially and chronologically), or all or some of the components may be fed after pre-emulsification. Once the polymerization process has ended, post-polymerization may be carried out using known methods to remove residual monomer, one example of a suitable method being post-polymerization initiated by a redox catalyst. Volatile residual monomers may also be removed by distillation, preferably at subatmospheric pressure, and, where appropriate, by passing inert entraining gases, such as air, nitrogen, or water vapor, through or over the material.

The solids contents of suitable VAE copolymer dispersions as made are typically in a range from 45 to 75% by weight, but dispersions with other solids levels may be used. The dispersions typically have a viscosity, if diluted to a 30% solids level, of at least 5 mPas, or at least 10 or 15 mPas. The viscosity will typically be at most 80 mPas, or at most 70, 60, 50, 40, or 30 mPas. As made, the dispersions typically have a formaldehyde content of at most 200 ppm, or at most 150, 100, or 50 ppm, as measured according to ASTM D5910-96.

Adhesive Composition

The adhesive composition comprises the aqueous VAE copolymer dispersion as the major ingredient. Other additives can be incorporated. Examples are plasticizers, for instance glycols or polyethylene glycols, which modify the mechanical properties of the adhesive composition; wetting agents, for Instance nonionic and/or anionic surfactants, which improve surface spreading or wetting capabilities; and thickeners. Exemplary nonionic surfactants include fatty alcohol ethers of polyoxyethylene compounds, or of polyoxypropylene compounds, or of mixed polyoxyethylene/polyoxypropylene compounds. One suitable example is an ethylene oxide-based nonionic surfactant sold by Air Products under the name SURFYNOL® 465. An exemplary anionic surfactant is sodium dioctyl sulfosuccinate.

Exemplary thickeners include water-soluble cellulose derivatives, for instance cellulose ethers. Suitable cellulose derivatives include methylcellulose, hydroxyethyl cellulose, hydroxypropylmethylcellulose, and carboxymethyicellulose. Typically, thickeners may be included in an amount to bring the viscosity of the adhesive composition to at least 20 mPas, or at least 30, 40, 50, 60, 70, or 80 mPas. Typically, the viscosity will be at most 500 mPas, or at most 400, 300, 200, 150, or 100 mPas. Higher viscosities are usually required for low-shear applications, for example laboratory-scale use, than for high-shear applications, such as on commercial equipment.

Other optional ingredients include the following:

acrylamide homopolymers and polyacrylamide copolymers not comprising crosslinkable moieties, for example NMA units;

polymers comprising units of any one or more of the following, alone or in any combination: ethylenically unsaturated carboxylic acids, acrylic acid, methacrylic acid, acrylic esters, methacrylic esters, maleic acid, maleic anhydride, fumaric acid, itaconic acid, crotonic acid, ethylenically unsaturated sulfonic acids, acrylonitrile, styrene, butadiene, vinyl alkyl ethers, chlorinated monomers, vinyl chloride, fluorinated monomers;

polyurethanes, polyacetals, polyvinylpyrollidones, polyvinylpyridines, polyacrylic acids, polymethacrylic acids, polyamidoamines, azetidinium-containing polymers, polymers comprising epoxy groups, poly(ethyloxazoline), polyethylenimines, polyvinylamines, and polyterpenes;

proteins, natural starches, modified starches (for example cationic starches); hydroxyalkylcelluloses;

alginates, pectins, chitosan, substituted chitosans;

pigments, solid particulate materials, water-insoluble minerals, clays, inorganic particulate materials;

compounds containing two or more aldehyde and/or protected aldehyde groups, for example acetals.

In some embodiments of the invention, the adhesive composition is free of isocyanate moieties.

In some embodiments, the adhesive composition excludes metal cations having a valency of 2 or more. Specific examples of metal cations that may be so excluded to include Al, Fe, Cr, Ti, Zr, Zn, V, Ca, and Mg cations. These exclusions or limitations may refer to cations present in water-soluble form, or cations present in Insoluble compounds and/or compounds capable of reacting with acids, for example carboxylic or sulfonic acids. While some amounts of these metals may be present as Impurities (e.g., Ca cations due to water hardness) in the adhesive compositions of the invention, they are not added as ingredients to the formulations and are not present in an amount effective to crosslink or otherwise substantially affect the activity of the adhesive composition in a crepe process. Levels of polyvalent metals in the adhesive compositions are typically very low, and usually below 0.1 wt % or 0.05 wt % or 0.02 wt %, based on emulsion nonvolatiles.

Other components that may be excluded from the adhesive composition include sulfate esters, sulfate ester surfactants, phosphate esters, phosphate ester surfactants, pentaerythritol, di-pentaerythritol, trimethylolpropane, di-trimethylolpropane, and alkylphenol ethoxylates. Other excludable components include ethoxylated secondary or branched primary alcohols, for example those containing from 7 to 30 moles of ethylene oxide and/or in which the alcohol contains 7 to 18 carbons; and sodium laureth sulfate, for example sodium laureth sulfate having 1 to 12 moles of ethylene oxide.

In some embodiments, the adhesive composition does not contain any vinyl acetate-containing polymer that does not comprise N-methylol monomer units.

Crepe Process

The fibrous nonwoven web that is creped according to the invention can be a natural fiber such as (but not limited to) cellulose fiber or wood pulp, or a synthetic fiber including but not limited to one or more of polyester, polyethylene, polypropylene and polyvinyl alcohol, or viscose fiber, or a combination of any of these, processed by a dry (airlaid, carded, rando) or wet laid process. The basis weight of the fibrous nonwoven web that is treated with the adhesive composition in a DRC process is typically at least 10 g/m$^2$, or at least 45 g/m$^2$, and is typically at most 150 g/m$^2$, or at most 120 g/m$^2$.

The adhesive composition of this invention can be used in crepe processes well known in the art. For example, the following process is suitable.

An aqueous fiber slurry is applied to a belt and then dewatered and dried to form a wet fibrous nonwoven web, which is transferred to the heated surface of a creping drum (Yankee dryer). Prior to this transfer, the adhesive composition is applied to the nonwoven web and/or to the surface of the creping drum, typically via spray application or gravure printing. The adhesive composition is typically applied at an add-on level based on % dry adhesive on dry substrate of at least 5 wt %, or at least 10 wt %, or at least 15 wt %. Typically, the level will be at most 40 wt %, or at most 30 wt %, or at most 20 wt %. The nonwoven web adheres to the surface of the creping drum and it is removed from the surface of the creping drum by use of a creping blade. Finally the dried and creped nonwoven web is wound onto a roll.

Typical DRC processes involve creping the base sheet or nonwoven web on a drum, printing a polymeric adhesive composition on one side of the sheet, flash drying the adhesive composition, creping the base sheet on a drum again, printing a polymeric adhesive composition on the other side of the base sheet, flash drying the adhesive composition, and then creping the base sheet a third time. The base sheet is printed while traveling through gravure nip rolls. Typically, the printing is done in a pattern such as a mesh or a series of unconnected discrete shapes.

Creping with adhesive compositions according to the invention provides three distinct advantages:

1. The stabilization with PVOH provides a nonionic dispersion character which is compatible with anionic, nonionic and cationic additives.
2. The copolymers provide a higher level of metal adhesion than typical surfactant-stabilized VAEs, which helps to improve the crepe process to provide the desired end results for the substrate.
3. The copolymers have improved heat age viscosity stability versus surfactant-stabilized VAEs designed for crepe processes.

EXAMPLES

Measurement of Tg

The glass transition temperature (Tg) of the copolymers was determined in by means of differential scanning calorimetry (DSC) using a Mettler-Toledo DSC1 dynamic differential scanning calorimeter with a heating rate of 10° K per minute according to ASTM D3418-82 as onset temperature. The onset of the glass transition was evaluated in the 2nd heating cycle.

Measurement of Viscosity—Brookfield

Unless otherwise noted, Brookfield viscosities of copolymer dispersions and adhesive compositions were determined using a Brookfield Viscometer Model LVD with a #3 spindle at 60 rpm and 25° C.

Viscosities of polyvinyl alcohols are Hoeppler viscosities of 4% aqueous solutions, determined at 20° C. in accordance with DIN 53015.

The following PVOH-stabilized vinyl acetate ethylene dispersions co-polymerized with NMA and acrylamide were prepared and tested.

Example 1

The following ingredients were mixed together: 35.392 kg of a 10% aqueous solution of SELVOL® 205 (a polyvinyl alcohol with average hydrolysis level of 87-89%, 4% solution viscosity of 5.2-6.2 mPas in water, available from Sekisui) was added to 32.0 g of sodium citrate dissolved in 4.537 kg of water. The pH of this mixture was adjusted to 4.1 using 175.0 g of a citric acid solution (50% in water), and 4.6 g of a ferrous ammonium sulfate was then added to the mixture. This mixture was added to a thirty five gallon (132.5 liter) pressure reactor that had been purged with nitrogen, and 47.975 kg of vinyl acetate was added with agitation (375 rpm).

The reactor was purged with ethylene, the agitation was maintained at 375 rpm, and 10.685 kg of ethylene was added to the reactor. The temperature was then increased to 32° C., and 208.0 g of a 4.70% aqueous sodium erythorbate solution (pH adjusted to 5.0 with citric acid) was added to the reactor. The reactor contents were allowed to equilibrate and the pressure at this point was 438 psi. A solution of 0.75% aqueous hydrogen peroxide and a solution of 4.70% sodium erythorbate (pH adjusted to 5.0 with citric acid) were continuously fed to the reactor at a rate of 13.0 g/min and 6.4 g/min respectively. After the temperature rose 1° C., the reactor temperature was allowed to increase to 85° C. over 135 minutes, and an additional 12.125 kg of vinyl acetate monomer was fed to the reactor over 165 minutes at a roughly constant rate. In addition, a total of 5.561 kg of an aqueous solution containing 4.45 wt % N-methylolacrylamide and 3.18% acrylamide was fed to the reactor over 154 minutes, and the feed line for the NMA-LF was rinsed to the reactor with an additional 0.375 kg of water. The addition rate for the NMA-LF was adjusted so that approximately two thirds of the solution was fed during the first half of the delay and the remaining one third of the solution was fed during the second half of the delay.

The flow rates of the hydrogen peroxide and sodium erythorbate feeds were maintained at an approximately 2:1 ratio and the flows were adjusted so that the 85° C. reaction temperature was maintained. The unreacted vinyl acetate was measured during the course of the reaction and found to be 29.6% after 1 h, 27.3% after 2 h, 7.6% after 3 h, and 3.3% after 3.5 h. At the end of 3.75 h, the hydrogen peroxide and sodium erythorbate feeds were stopped, the reaction was cooled to 60° C. and the reaction mixture was transferred to a degasser to remove unreacted ethylene. A mixture of 66.0 g of Foamaster® MO 2185 defoamer (available from BASF Chemical Corp.) and 110.0 g of water were added to inhibit foam formation. In order to reduce unreacted vinyl acetate monomer below 0.1%, 0.871 kg of an 8.02% aqueous sodium erythorbate solution and 2.558 kg of a 6.82% aqueous tert-butyl hydroperoxide solution were added over 40 minutes. Finally, 0.636 kg of a 7.01% aqueous hydrogen peroxide solution was added over 30 minutes.

The copolymer composition was 81.9% vinyl acetate, 17.5% ethylene, 0.35% NMA and 0.25% acrylamide, stabilized with 5.0% PVOH.

The final properties of the dispersion were as follows:

| | |
|---|---|
| Solids: | 56.1% |
| pH: | 4.1 |
| Viscosity (60 rpm): | 698 mPas |
| Grit (unfiltered, 100 mesh): | 24 ppm |
| Unreacted vinyl acetate: | 216 ppm |
| Tg (onset): | 8.6° C. |

Example 2

The following ingredients were mixed together: 27.436 kg of a 10% aqueous solution of SELVOL® 205 (a polyvinyl alcohol with average hydrolysis level of 87-89%, 4% solution viscosity of 5.2-6.2 mPas in water, available from Sekisui) was added to 25.0 g of sodium citrate dissolved in 3.380 kg of water. The pH of this mixture was adjusted to 4.1 using 150.0 g of a citric acid solution (50% in water), and 3.6 g of a ferrous ammonium sulfate was then added to the mixture. This mixture was added to a thirty five gallon (132.5 liter) pressure reactor that had been purged with nitrogen, and 37.190 kg of vinyl acetate was added with agitation (375 rpm).

The reactor was purged with ethylene, the agitation was maintained at 375 rpm, and 8.283 kg of ethylene was added to the reactor. The temperature was then increased to 32° C., and 114.0 g of a 6.35% aqueous sodium erythorbate solution (pH adjusted to 5.0 with citric acid) was added to the reactor. The reactor contents were allowed to equilibrate and the pressure at this point was 393 psi. A solution of 2.00% aqueous hydrogen peroxide and a solution of 6.35% sodium erythorbate (pH adjusted to 5.0 with citric acid) were both continuously fed to the reactor at a rate of 4.9 g/min. After the temperature rose 1° C., the reactor temperature was allowed to increase to 85° C. over 70 minutes, and an additional 9.400 kg of vinyl acetate monomer was fed to the reactor over 130 minutes at a roughly constant rate. In addition, a total of 7.048 kg of an aqueous solution containing approximately 20.42% N-methylolacrylamide and 14.58% acrylamide, available from SNF Floerger) was fed to the reactor over 130 minutes, and the feed line for the NMA-LF was rinsed to the reactor with an additional 0.375 kg of water. The addition rate for the NMA-LF was adjusted so that approximately two thirds of the solution was fed during the first half of the delay and the remaining one third of the solution was fed during the second half of the delay.

The hydrogen peroxide and sodium erythorbate feeds were maintained at approximately equal flow rates, and the flows were adjusted so that the 85° C. reaction temperature was maintained. The unreacted vinyl acetate was measured during the course of the reaction and found to be 35.9% after 1 h, 12.2% after 2 h. At the end of 2.5 h, the hydrogen peroxide and sodium erythorbate feeds were stopped, the reaction was cooled to 60° C. and the reaction mixture was transferred to a degasser to remove unreacted ethylene. A mixture of 51.0 g of Foamaster® MO 2185 defoamer (available from BASF Chemical Corp.) and 110 g of water were added to inhibit foam formation.

In order to reduce unreacted vinyl acetate monomer below 0.1%, 0.776 kg of a 9.0% aqueous sodium erythorbate solution and 0.674 kg of an 8.0% aqueous tert-butyl hydroperoxide solution were added over 40 minutes. Finally, 0.494 kg of a 7.0% aqueous hydrogen peroxide solution was added over 30 minutes.

The copolymer composition was 81.3% vinyl acetate, 14.4% ethylene, 2.5% NMA and 1.8% acrylamide, stabilized with 4.8% PVOH.

The final properties of the dispersion were as follows:

| | |
|---|---|
| Solids: | 58.3% |
| pH: | 4.3 |
| Viscosity (60 rpm): | 768 mPas |
| Grits (unfiltered, 100 mesh): | 6 ppm |
| Unreacted vinyl acetate: | 181 ppm |
| Tg (onset): | 13.5° C. |

Table 1 shows additional properties of the comparative and inventive VAE dispersions.

TABLE 1

| Example | Stabilizer | NMA % (in copolymer) | Acrylamide % (in copolymer) | Solids % | Viscosity mPas | Formaldehyde (ppm) |
|---|---|---|---|---|---|---|
| Comp. Ex 1 VAE* | Surfactant | 4.92 | — | 52 | 1076 | 508 |
| Example 1 | PVOH | 0.35 | 0.25 | 52 | 90 | 7 |
| Example 2 | PVOH | 2.5 | 1.8 | 52 | 142 | 37 |

*VINNAPAS® EN1165 was used. It is a self-crosslinking VAE dispersion comprising no acrylamide units, stabilized with a surfactant system, with a Tg of about 0° C. and solids content of about 52%. This dispersion contains no polyvinyl alcohol.

Application of Adhesive Composition to DRC Base Sheet

Each adhesive composition listed was print applied to a DRC uncoated base sheet having a basis weight of about 65 g/m². An add-on of 20% dry adhesive composition on dry substrate was targeted. The print application of the adhesive composition to the DRC substrate was as described below:

A DRC uncoated base sheet was attached to a size of 16 inches (40.64 cm) in machine direction (MD) and 3½ inches (8.89 cm) in cross-machine direction (CD) and this substrate was taped to a paperboard cut to size of 18 Inches (45.72 cm) long and 4 inches (10.16 cm) width.

The adhesive compositions were formulated to 25% solids content and the Brookfield viscosity was adjusted to between 350 and 450 mPas using a 1% solution of hydroxyethyl cellulose (Natrosol 250 MR from Ashland Chemical). To these compositions, a wetting surfactant (sodium dioctyl sulfosuccinate, available from Cytec Corp. as AEROSOL® OT) and ammonium chloride catalyst were each added at a 1% (solids on dispersion solids) level.

The adhesive composition was added to the pan of a lab Geiger proofing press (Geiger Tool & Manufacturer Co.) equipped with a gravure roll and a backing rubber roll which form a nip when the two rolls come together. The gravure roll sits in the pan and picks up the adhesive composition into the gravure cells as the roll is rotated in the pan containing the adhesive composition. The uncoated DRC substrate and paperboard backing were placed into the nip and as the rolls rotated the adhesive composition pickup up by the gravure cells was deposited onto the DRC base sheet for coating and penetrating the substrate.

The coated substrate was then dried for 180 seconds at a temperature of 320° F. (160° C.) in a Mathis LTE through air oven.

Wet and Dry Tensile Strength Determination

The bonded substrate was die cut using a 1"×6" die cutter to prepare samples for tensile strength determination. The strips were placed in the jaws of an Instron mechanical tensile tester. For dry tensile determination the die cut samples were placed vertically into the jaws of the tester and the test is initiated. The tensile tester provides the statistics of the maximum tensile achieved at break. A cross head speed of 6"/minute is used and a gauge length of 4" was set for dry tensile determination. A number of tests were performed with the average calculated and reported.

Wet tensile measurement is determined similarly except that the sample was placed into a Finch Cup apparatus that includes a water-filled reservoir. The sample was looped around a metal bar and then dipped into the water and held there for 15 seconds. The tensile test is then initiated. A gauge length of 2" is used due to the loop effect of the tensile strip. The maximum wet strength is determined by the tensile tester. Several tests were performed and the average was calculated.

Metal Adhesion and Release Testing Procedure

In order for a base sheet or web to adhere adequately to the creping drum in a DRC process, traditional polymeric adhesive compositions are applied to the base sheet or web prior to making contact with the heated creping drum. These traditional polymeric adhesives are typically emulsion polymers containing various surfactants. One such adhesive composition used for adhering the base sheet to the creping drum includes VINNAPAS® EN1165, a surfactant stabilized VAE dispersion produced by Wacker Chemical Corporation, Adrian, Mich. (Comparative Example 1). The PVOH-stabilized VAE's described by the present invention (Examples 1 and 2) were evaluated for adhesion to metal surfaces and compared with VINNAPAS® EN1165 (Comparative Example 1). Adhesion results should be 35% to 200% of the adhesion of a standard control such as AIR-FLEX® 105 VAE emulsion, as noted in U.S. Pat. No. 8,012,285, or of a similar but alkylphenol ethoxylate-free VAE emulsion such as VINNAPAS® EN1165.

The metal adhesion value of adhesive compositions identified for the crepe processes, especially DRC processes, were measured using the following adhesion and release procedure, as described in U.S. Pat. No. 6,918,305.

A 2-inch×6-inch×1/32-inch (5.08 cm×15.24 cm×794 μm) stainless steel plate was attached to a movable heated (270° F.; 132° C.) inclined (450 angle) metal platform and the plate was allowed to equilibrate to the temperature of the platform (~2 minutes). Approximately 0.42 grams of the copolymer dispersion on a dry basis was applied to a 1½-inch×6-inch (3.81 cm×15.24 cm) piece of bleached mercerized cotton poplin. The coated side of the coated cotton poplin was pressed onto the heated stainless steel plate with a 3 pound (1.36 kg) lab roller by rolling the lab roller back and forth over the substrate for 10 seconds. After 30 seconds, the stainless steel plate was moved away from the tensile measuring device (to which the substrate is attached) at a rate of 12 Inches/min (30.48 cm/minute). The amount of force needed to remove the cotton from the stainless steel plate (peel strength) is reported in Table 2.

TABLE 2

| Example | Stabilizer | MD Dry Tensile g/inch width (g/cm width) | MD Wet Tensile g/inch width (g/cm width) | Peel Strength g/inch width (g/cm width) |
|---|---|---|---|---|
| Comp. Ex. 1 VAE | Surfactant | 3990 (1571) | 2473 (974) | 158 (62) |
| Example 1 | PVOH | 4719 (1858) | 2163 (852) | 314 (124) |
| Example 2 | PVOH | 3868 (1523) | 2065 (813) | 288 (113) |

As seen in Table 2, adhesive compositions based on PVOH-protected VAE dispersions comprising NMA and acrylamide units can be used as adhesives for DRC applications, providing both good adhesion to metal and high levels of dry and wet tensile strength as compared to a surfactant protected VAE (Comparative Example 1, VINNAPAS® EN1165) comprising no acrylamide units.

Heat Age Stability Testing

Heat age stability testing provides a method of accelerating the aging of an emulsion by maintaining the emulsion at an elevated temperature over a designated period of time. The results of the testing help to predict the effect of aging on emulsion product viscosity and pH. Large changes in either pH or viscosity can create issues for the end use customer when the process depends on keeping pH and viscosity within certain ranges. A large jump in dispersion viscosity in particular can create pumping issues, formulation issues and application/coating problems.

Dispersion samples were diluted with deionized water to a solids level of 52%. An initial pH and viscosity (Brookfield LVD viscosity at 25° C., 60 rpm, spindle #3) were measured at room temperature. The samples were then sealed and placed in a through air oven at 120° F. (49° C.). The samples were then removed from the oven at the required test interval, typically 1, 2 and 3 weeks and allowed to equilibrate at room temperature. Once at room temperature, the samples were hand stirred and pH and viscosity were re-measured. The samples were returned to the oven until all test intervals had been completed. The results are listed in Table 3.

The results of heat age stability testing demonstrate that the PVOH protected VAE's comprising NMA/acrylamide functionality (Examples 1 and 2) have much better viscosity stability than the surfactant protected VAE VINNAPAS® EN1165 (Comparative Example 1).

TABLE 3

|  | Comp. Ex. 1 | Example 1 | Example 2 |
| --- | --- | --- | --- |
| Initial Properties | | | |
| Solids (%) | 52 | 52 | 52 |
| pH | 5.3 | 3.9 | 4.0 |
| Viscosity (mPas) | 1076 | 90 | 142 |
| 1 week | | | |
| pH | 5.2 | 3.9 | 4.0 |
| Viscosity (mPas) | 1242 | 160 | 324 |
| 2 weeks | | | |
| pH | 5.1 | 3.9 | 4.0 |
| Viscosity (mPas) | 2860* | 122 | 400 |
| 3 weeks | | | |
| pH | 5.0 | 3.9 | 4.1 |
| Viscosity (mPas) | 5550* | 120 | 516 |
| 4 weeks | | | |
| pH | 4.9 | 3.9 | 4.1 |
| Viscosity (mPas) | 7960* | 116 | 479 |

*Brookfield spindle #4 was needed, due to the higher viscosity

The invention claimed is:

1. In a crepe process comprising applying an adhesive composition to a nonwoven web, drying, and creping the nonwoven web on a creping drum, the improvement comprising applying an adhesive composition comprising an aqueous copolymer dispersion obtained by emulsion polymerization of a monomer mixture comprising 65 to 94.5% by weight of vinyl acetate, 5 to 30% by weight of ethylene, (meth)acrylamide, and 0.1 to 4% by weight of an N-methylol functional monomer, wherein the N-methylol functional monomer constitutes from 25 to 85% by weight of the combined amounts of (meth)acrylamide and N-methylol functional monomer, said combined amounts constituting from 0.5 to 4% by weight of the monomer mixture;
wherein the emulsion polymerization is performed in the presence of 1 to 10% by weight of polyvinyl alcohol, based in each case on the total weight of all monomers used for the polymerization;
wherein the adhesive composition does not comprise any of the following types of surfactant:
alkylphenol ethoxylate, phosphate ester, or sodium laureth sulfate, and wherein the polyvinyl alcohol has a degree of hydrolysis in a range from 86% to 89 mol %, wherein the polyvinyl alcohol is present in an amount of from 2.5 to 10% by weight.

2. The process of claim 1, wherein the polyvinyl alcohol is present in an amount of from 3 to 10% by weight.

3. In a crepe process comprising applying an adhesive composition to a nonwoven web, drying, and creping the nonwoven web on a creping drum, the improvement comprising applying an adhesive composition comprising an aqueous copolymer dispersion obtained by emulsion polymerization of a monomer mixture comprising 65 to 94.5% by weight of vinyl acetate, 5 to 30% by weight of ethylene, (meth)acrylamide, and 0.1 to 4% by weight of an N-methylol functional monomer, wherein the N-methylol functional monomer constitutes from 25 to 85% by weight of the combined amounts of (meth)acrylamide and N-methylol functional monomer, said combined amounts constituting from 0.5 to 4% by weight of the monomer mixture;
wherein the emulsion polymerization is performed in the presence of 1 to 10% by weight of polyvinyl alcohol, based in each case on the total weight of all monomers used for the polymerization;
wherein the adhesive composition does not comprise any of the following types of surfactant:
alkylphenol ethoxylate, phosphate ester, or sodium laureth sulfate, and wherein the polyvinyl alcohol has a degree of hydrolysis in a range from 86% to 89 mol %, wherein the adhesive composition contains no ethoxylated secondary alcohols and no ethoxylated branched primary alcohols as emulsifiers.

* * * * *